US012632811B2

(12) United States Patent (10) Patent No.: US 12,632,811 B2
Wernze et al. (45) Date of Patent: May 19, 2026

(54) BUSINESS PROCESS DEFINITION AND CONTROL SERVICE

(71) Applicant: SAP SE, Walldorf (DE)

(72) Inventors: Frank Wernze, Muenster (DE); Gerhard Schick, Rottenburg am Nickar (DE)

(73) Assignee: SAP SE, Walldorf (DE)

( * ) Notice: Subject to any disclaimer, the term of this patent is extended or adjusted under 35 U.S.C. 154(b) by 680 days.

(21) Appl. No.: 18/106,265

(22) Filed: Feb. 6, 2023

(65) Prior Publication Data

US 2024/0265324 A1 Aug. 8, 2024

(51) Int. Cl.
*G06Q 10/0633* (2023.01)
*G06Q 10/067* (2023.01)

(52) U.S. Cl.
CPC ....... *G06Q 10/0633* (2013.01); *G06Q 10/067* (2013.01)

(58) Field of Classification Search
None
See application file for complete search history.

(56) References Cited

U.S. PATENT DOCUMENTS

| | | | | | |
|---|---|---|---|---|---|
| 2016/0300177 | A1* | 10/2016 | Wilmes | ............ | G06Q 10/06316 |
| 2017/0124493 | A1* | 5/2017 | Chan | .................. | G06Q 10/0633 |
| 2018/0204149 | A1* | 7/2018 | Cortes Cornax | ......... | G06F 8/34 |
| 2023/0385036 | A1* | 11/2023 | Vacchi | ...................... | G06F 8/35 |

OTHER PUBLICATIONS

G. Kang, L. Yang, L. Zhang, J. Liu and Y. Wen, "Organization-driven business process configurable modeling for spatial variability," in China Communications, vol. 18, No. 11, pp. 229-242, Nov. 2021. (Year: 2021).*

* cited by examiner

*Primary Examiner* — Frank D Mills
(74) *Attorney, Agent, or Firm* — SCHWEGMAN LUNDBERG & WOESSNER, P.A.

(57) ABSTRACT
A new methodology for describing business processes and permissible process variants is introduced. Additionally, an allowed system status and involved master data objects with read and change authorization can be defined for process step. If a user wants to run the defined process in a BPM product, the system connection may be made from an authorized central solution manager system (connected to all systems in a landscape) so it is possible to run predefined processes. As soon as a process step shall be executed, a central cloud service can be executed. The central cloud service can access and analyze selected objects. The execution system, which may be a completely different system than the system that defined the business process, can then execute an associated process step, and a process pointer will store the data in involved systems and set a new status.

20 Claims, 10 Drawing Sheets

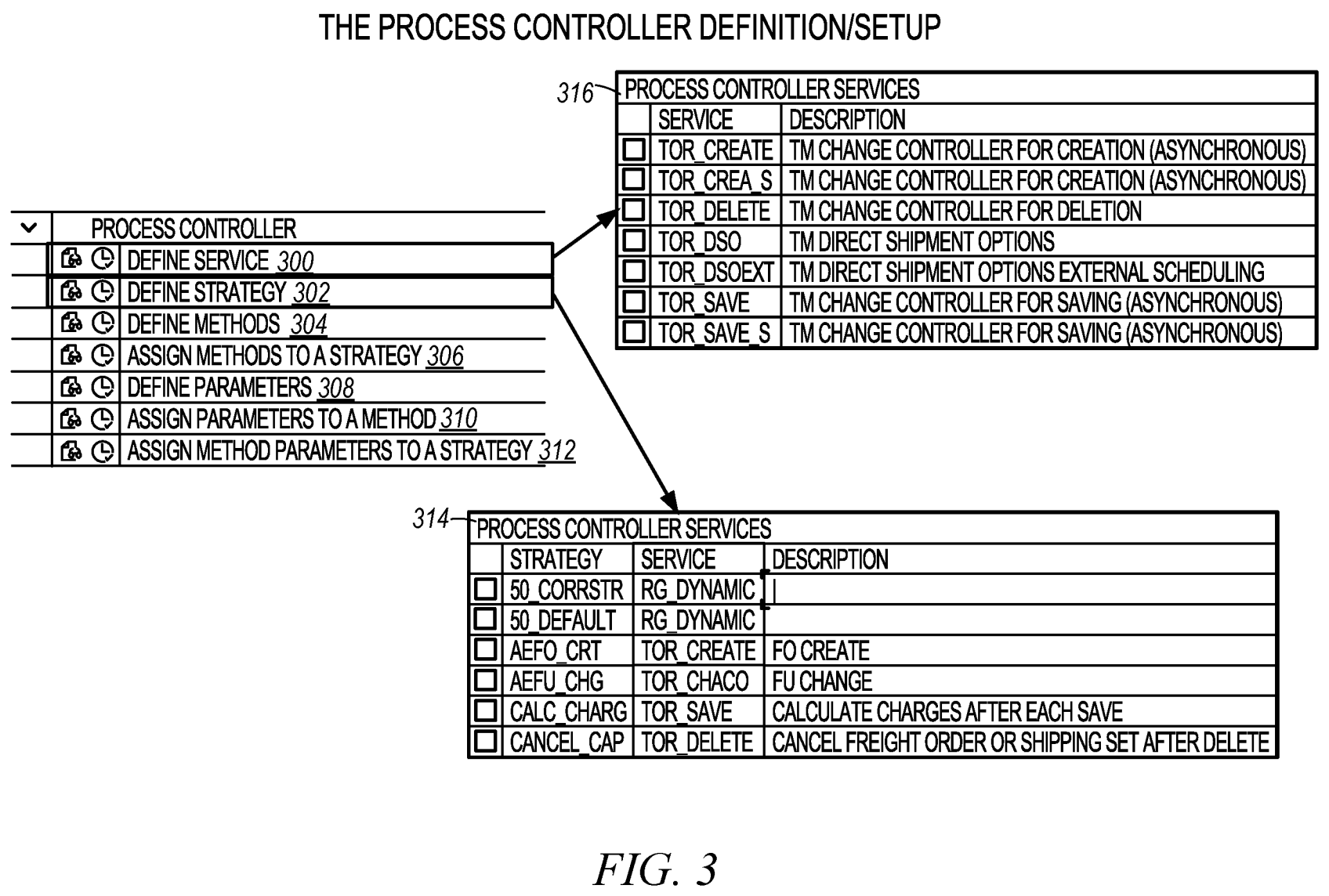

THE PROCESS CONTROLLER DEFINITION/SETUP

| PROCESS CONTROLLER |
|---|
| ⚙ 🕐 DEFINE SERVICE 300 |
| ⚙ 🕐 DEFINE STRATEGY 302 |
| ⚙ 🕐 DEFINE METHODS 304 |
| ⚙ 🕐 ASSIGN METHODS TO A STRATEGY 306 |
| ⚙ 🕐 DEFINE PARAMETERS 308 |
| ⚙ 🕐 ASSIGN PARAMETERS TO A METHOD 310 |
| ⚙ 🕐 ASSIGN METHOD PARAMETERS TO A STRATEGY 312 |

316 —

PROCESS CONTROLLER SERVICES

| | SERVICE | DESCRIPTION |
|---|---|---|
| ☐ | TOR_CREATE | TM CHANGE CONTROLLER FOR CREATION (ASYNCHRONOUS) |
| ☐ | TOR_CREA_S | TM CHANGE CONTROLLER FOR CREATION (ASYNCHRONOUS) |
| ☐ | TOR_DELETE | TM CHANGE CONTROLLER FOR DELETION |
| ☐ | TOR_DSO | TM DIRECT SHIPMENT OPTIONS |
| ☐ | TOR_DSOEXT | TM DIRECT SHIPMENT OPTIONS EXTERNAL SCHEDULING |
| ☐ | TOR_SAVE | TM CHANGE CONTROLLER FOR SAVING (ASYNCHRONOUS) |
| ☐ | TOR_SAVE_S | TM CHANGE CONTROLLER FOR SAVING (ASYNCHRONOUS) |

314 —

PROCESS CONTROLLER SERVICES

| | STRATEGY | SERVICE | DESCRIPTION |
|---|---|---|---|
| ☐ | 50_CORRSTR | RG_DYNAMIC | |
| ☐ | 50_DEFAULT | RG_DYNAMIC | |
| ☐ | AEFO_CRT | TOR_CREATE | FO CREATE |
| ☐ | AEFU_CHG | TOR_CHACO | FU CHANGE |
| ☐ | CALC_CHARG | TOR_SAVE | CALCULATE CHARGES AFTER EACH SAVE |
| ☐ | CANCEL_CAP | TOR_DELETE | CANCEL FREIGHT ORDER OR SHIPPING SET AFTER DELETE |

FIG. 3

THE PROCESS CONTROLLER-THE BRIDGE BETWEEN BUSINESS
PROCESS DEFINITION AND DEVELOPMENT REQUIREMENTS

THE PROCESS CONTROLLER METHOD ASSIGNMENT—
ONCE DEVELOPED AND MULTIPLE TIMES ASSIGNED

CONTROLLER METHOD POOL

| METHOD | SERVICE | DESCRIPTION | METHTYPE | CLASS/INTERFACE | INTERFACE COMPONENT |
|---|---|---|---|---|---|
| UNFIX_TORC | TOR_CREATE | UNFIX TORS FOR CREATE STRATEGY | BASIC METHOD ∨ | /SCM/TMS/CL_CREATE_SAVE_METHODS | UNFIX_TOR_FOR_PROC |
| UNFIX_TORS | TOR_SAVE | UNFIX TORS FOR SAVE STRATEGY | BASIC METHOD ∨ | /SCM/TMS/CL_CREATE_SAVE_METHODS | UNFIX_TOR_FOR_PROC |
| UNFIX_TORU | FOR_CHACO | UNFIX TORS FOR CHANGE STRATEGY | BASIC METHOD ∨ | /SCM/TMS/CL_CHACO_METHODS | UNFIX_TOR_FOR_PROC |

| AE_CRT_FO | CREATE FO OUT OF FU | | 1 |
| UNFIX_TORS | UNFIX TORS FOR SAVE STRATEGY | | 5 |
| CALC_CHARG | CALCULATE CHARGES | | 10 |
| REFIX_TORS | REFIX TORS FOR SAVE STRATEGY | | 20 |
| CANC_ORDEL | CANCEL FREIGHT ORDER OR TRANSPORTATION UNIT | | 10 |
| UNFIX_TORU | UNFIX TORS FOR CHANGE STRATEGY | | 5 |
| STOP_TEND | STOP CURRENT TENDERING | | 10 |
| CANCEL_FOR | CANCEL FREIGHT ORDER OR TRANSPORTATION UNIT | | 20 |
| REFIX_TORU | REFIX TORS FOR CHANGE STRATEGY | | 30 |

METHOD ASS

STRATEG

| AEFO_CR |
| AEFU_CHG | FU CHANGE |
| CALC_CHARG | CALCULATE CHARGES AFTER EACH SAVE |
| CALC_CHARG | CALCULATE CHARGES AFTER EACH SAVE |
| CALC_CHARG | CALCULATE CHARGES AFTER EACH SAVE |
| CANCEL_CAP | CANCEL FREIGHT ORDER OR SHIPPING SET AFTER DELETE |
| CANCEL_FOR | STOP TENDERING AND CANCEL THE FREIGHT ORDER |
| CANCEL_FOR | STOP TENDERING AND CANCEL THE FREIGHT ORDER |
| CANCEL_FOR | STOP TENDERING AND CANCEL THE FREIGHT ORDER |
| CANCEL_FOR | STOP TENDERING AND CANCEL THE FREIGHT ORDER |

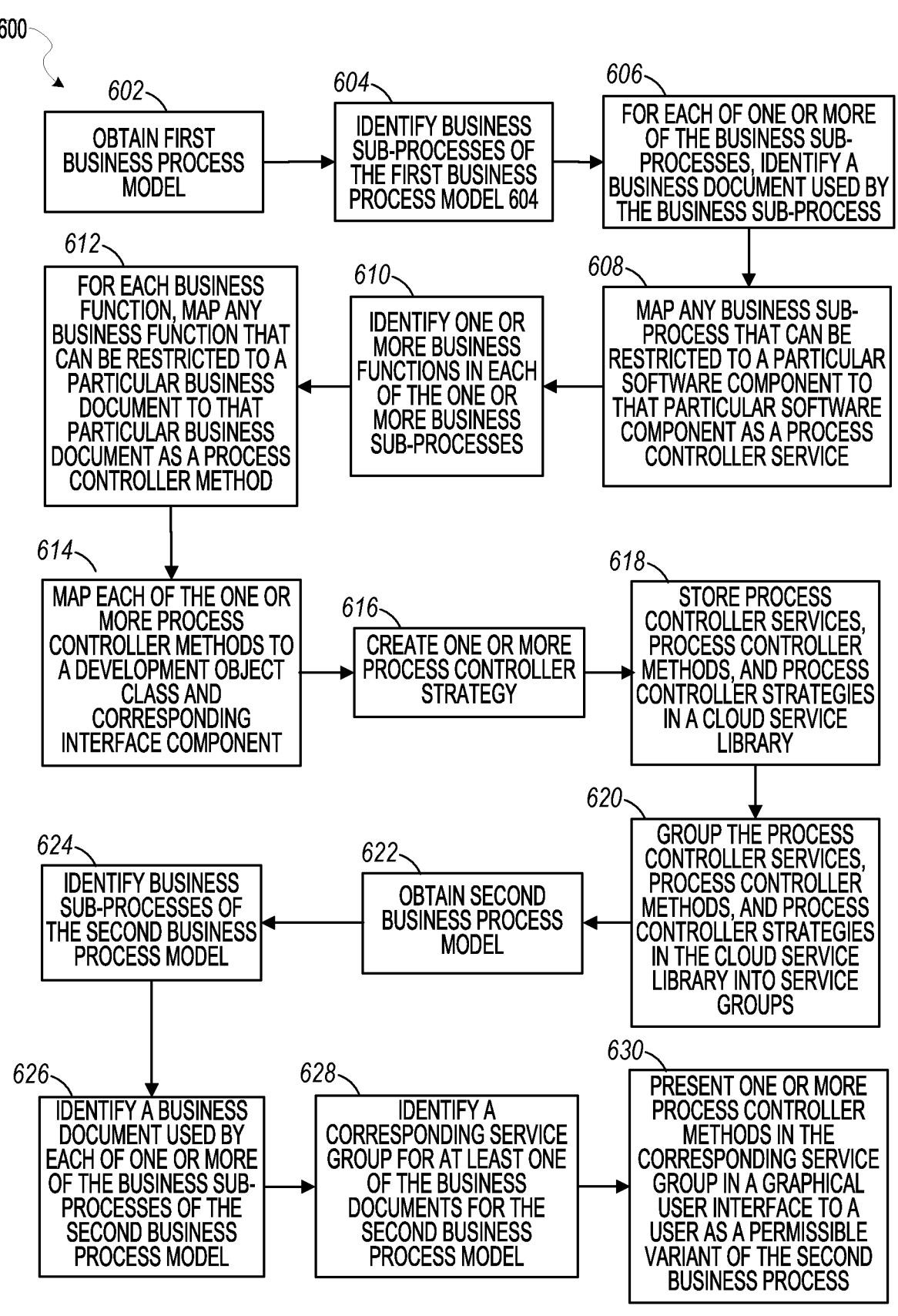

600

602
OBTAIN FIRST BUSINESS PROCESS MODEL

604
IDENTIFY BUSINESS SUB-PROCESSES OF THE FIRST BUSINESS PROCESS MODEL 604

606
FOR EACH OF ONE OR MORE OF THE BUSINESS SUB-PROCESSES, IDENTIFY A BUSINESS DOCUMENT USED BY THE BUSINESS SUB-PROCESS

612
FOR EACH BUSINESS FUNCTION, MAP ANY BUSINESS FUNCTION THAT CAN BE RESTRICTED TO A PARTICULAR BUSINESS DOCUMENT TO THAT PARTICULAR BUSINESS DOCUMENT AS A PROCESS CONTROLLER METHOD

610
IDENTIFY ONE OR MORE BUSINESS FUNCTIONS IN EACH OF THE ONE OR MORE BUSINESS SUB-PROCESSES

608
MAP ANY BUSINESS SUB-PROCESS THAT CAN BE RESTRICTED TO A PARTICULAR SOFTWARE COMPONENT TO THAT PARTICULAR SOFTWARE COMPONENT AS A PROCESS CONTROLLER SERVICE

614
MAP EACH OF THE ONE OR MORE PROCESS CONTROLLER METHODS TO A DEVELOPMENT OBJECT CLASS AND CORRESPONDING INTERFACE COMPONENT

616
CREATE ONE OR MORE PROCESS CONTROLLER STRATEGY

618
STORE PROCESS CONTROLLER SERVICES, PROCESS CONTROLLER METHODS, AND PROCESS CONTROLLER STRATEGIES IN A CLOUD SERVICE LIBRARY

620
GROUP THE PROCESS CONTROLLER SERVICES, PROCESS CONTROLLER METHODS, AND PROCESS CONTROLLER STRATEGIES IN THE CLOUD SERVICE LIBRARY INTO SERVICE GROUPS

624
IDENTIFY BUSINESS SUB-PROCESSES OF THE SECOND BUSINESS PROCESS MODEL

622
OBTAIN SECOND BUSINESS PROCESS MODEL

626
IDENTIFY A BUSINESS DOCUMENT USED BY EACH OF ONE OR MORE OF THE BUSINESS SUB-PROCESSES OF THE SECOND BUSINESS PROCESS MODEL

628
IDENTIFY A CORRESPONDING SERVICE GROUP FOR AT LEAST ONE OF THE BUSINESS DOCUMENTS FOR THE SECOND BUSINESS PROCESS MODEL

630
PRESENT ONE OR MORE PROCESS CONTROLLER METHODS IN THE CORRESPONDING SERVICE GROUP IN A GRAPHICAL USER INTERFACE TO A USER AS A PERMISSIBLE VARIANT OF THE SECOND BUSINESS PROCESS

*FIG. 6*

Figure 7:
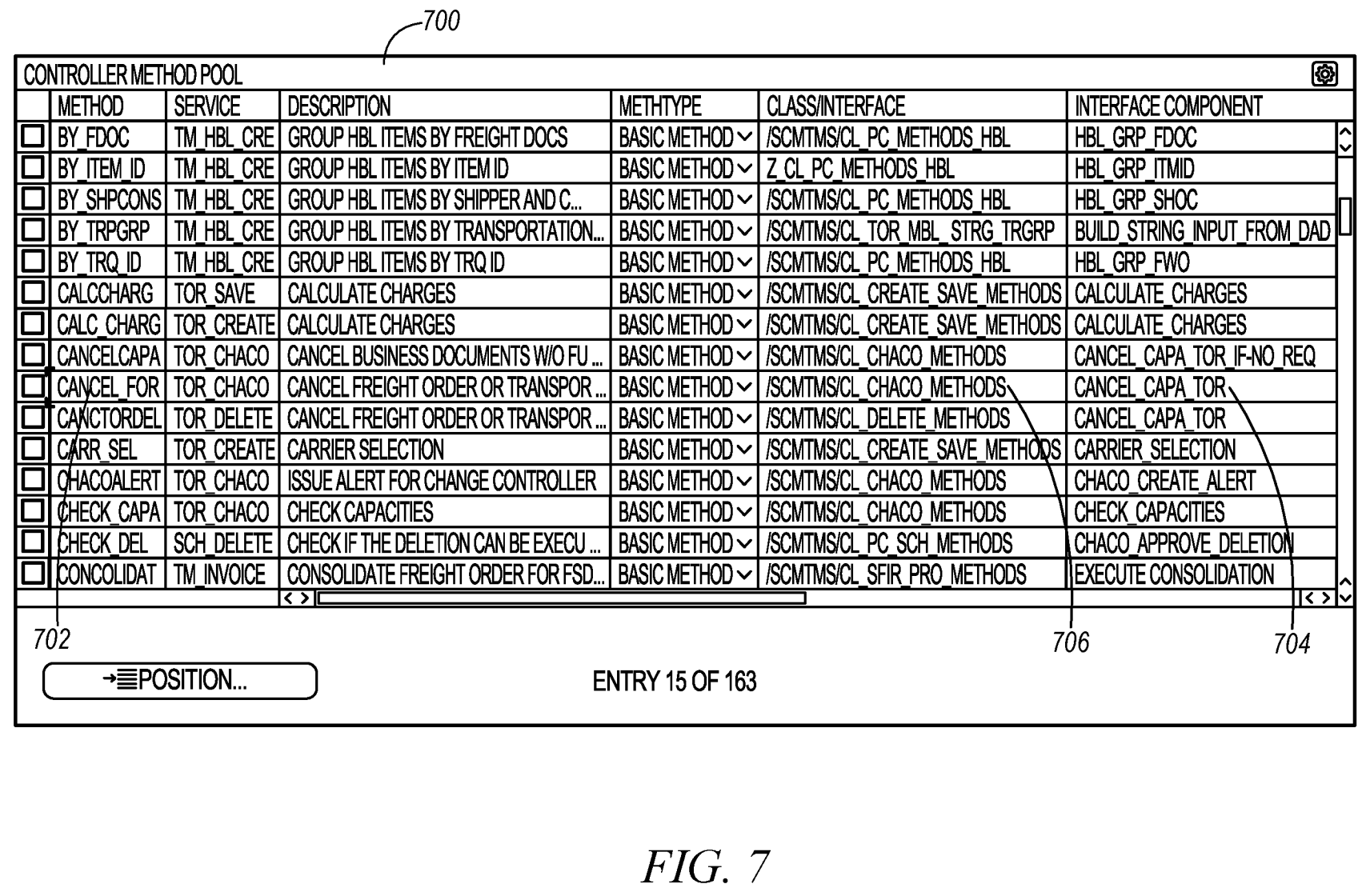

CONTROLLER METHOD POOL

| METHOD | SERVICE | DESCRIPTION | METHTYPE | CLASS/INTERFACE | INTERFACE COMPONENT |
|---|---|---|---|---|---|
| BY_FDOC | TM_HBL_CRE | GROUP HBL ITEMS BY FREIGHT DOCS | BASIC METHOD | /SCM/TMS/CL_PC_METHODS_HBL | HBL_GRP_FDOC |
| BY_ITEM_ID | TM_HBL_CRE | GROUP HBL ITEMS BY ITEM ID | BASIC METHOD | Z_CL_PC_METHODS_HBL | HBL_GRP_ITMID |
| BY_SHPCONS | TM_HBL_CRE | GROUP HBL ITEMS BY SHIPPER AND C... | BASIC METHOD | /SCM/TMS/CL_PC_METHODS_HBL | HBL_GRP_SHOC |
| BY_TRPGRP | TM_HBL_CRE | GROUP HBL ITEMS BY TRANSPORTATION... | BASIC METHOD | /SCM/TMS/CL_TOR_MBL_STRG_TRGRP | BUILD_STRING_INPUT_FROM_DAD |
| BY_TRQ_ID | TM_HBL_CRE | GROUP HBL ITEMS BY TRQ ID | BASIC METHOD | /SCM/TMS/CL_PC_METHODS_HBL | HBL_GRP_FWO |
| CALCCHARG | TOR_SAVE | CALCULATE CHARGES | BASIC METHOD | /SCM/TMS/CL_CREATE_SAVE_METHODS | CALCULATE_CHARGES |
| CALC_CHARG | TOR_CREATE | CALCULATE CHARGES | BASIC METHOD | /SCM/TMS/CL_CREATE_SAVE_METHODS | CALCULATE_CHARGES |
| CANCELCAPA | TOR_CHACO | CANCEL BUSINESS DOCUMENTS W/O FU... | BASIC METHOD | /SCM/TMS/CL_CHACO_METHODS | CANCEL_CAPA_TOR_IF-NO_REQ |
| CANCEL_FOR | TOR_CHACO | CANCEL FREIGHT ORDER OR TRANSPOR... | BASIC METHOD | /SCM/TMS/CL_CHACO_METHODS | CANCEL_CAPA_TOR\ |
| CANCTORDEL | TOR_DELETE | CANCEL FREIGHT ORDER OR TRANSPOR... | BASIC METHOD | /SCM/TMS/CL_DELETE_METHODS | CANCEL_CAPA_TOR |
| CARR_SEL | TOR_CREATE | CARRIER SELECTION | BASIC METHOD | /SCM/TMS/CL_CREATE_SAVE_METHODS | CARRIER_SELECTION |
| CHACOALERT | TOR_CHACO | ISSUE ALERT FOR CHANGE CONTROLLER | BASIC METHOD | /SCM/TMS/CL_CHACO_METHODS | CHACO_CREATE_ALERT |
| CHECK_CAPA | TOR_CHACO | CHECK CAPACITIES | BASIC METHOD | /SCM/TMS/CL_CHACO_METHODS | CHECK_CAPACITIES |
| CHECK_DEL | SCH_DELETE | CHECK IF THE DELETION CAN BE EXECU... | BASIC METHOD | /SCM/TMS/CL_PC_SCH_METHODS | CHACO_APPROVE_DELETION |
| CONSOLIDAT | TM_INVOICE | CONSOLIDATE FREIGHT ORDER FOR FSD... | BASIC METHOD | /SCM/TMS/CL_SFIR_PRO_METHODS | EXECUTE CONSOLIDATION |

ENTRY 15 OF 163

→≡POSITION...

METHOD ASSIGNMENT TO STRATEGY

| STRATEGY | STRATEGY DESCRIPTION | METHOD | METHOD DESCRIPTION | SEQUENCE |
|---|---|---|---|---|
| ☐ CALC_CHARG | CALCULATE CHARGES AFTER EACH SAVE | UNFIX_TORS | UNFIX TORS FOR SAVE STRATEGY | 5 |
| ☐ CALC_CHARG | CALCULATE CHARGES AFTER EACH SAVE | CALCCHARG | CALCULATE CHARGES | 10 |
| ☐ CALC_CHARG | CALCULATE CHARGES AFTER EACH SAVE | REFIX_TORS | REFIX TORS FOR SAVE STRATEGY | 20 |
| ☐ CANCEL_CAP | CANCEL FREIGHT ORDER OR SHIPPING SET AFTER DELETE | CANCTORDEL | CANCEL FREIGHT ORDER OR TRANSPORTATION UNIT | 10 |
| ☐ CANCEL_FOR | STOP TENDERING AND CANCEL THE FREIGHT ORDER | UNFIX_TORU | UNFIX TORS FOR CHANGE STRATEGY | 5 |
| ☐ CANCEL_FOR | STOP TENDERING AND CANCEL THE FREIGHT ORDER | STOP_TEND | STOP CURRENT TENDERING | 10 |
| ☐ CANCEL_FOR | STOP TENDERING AND CANCEL THE FREIGHT ORDER | CANCEL_FOR | CANCEL FREIGHT ORDER OR TRANSPORTATION UNIT | 20 |
| ☐ CANCEL_FOR | STOP TENDERING AND CANCEL THE FREIGHT ORDER | REFIX_TORU | REFIX TORS FOR CHANGE STRATEGY | 30 |
| ☐ CARR_SEL | CARRIER SELECTION ON CREATE | UNFIX_TORC | UNFIX TORS FOR CREATE STRATEGY | 5 |
| ☐ CARR_SEL | CARRIER SELECTION ON CREATE | CAR_SEL | CARRIER SELECTION | 10 |
| ☐ CARR_SEL | CARRIER SELECTION ON CREATE | REFIX_TORC | REFIX TORS FOR CREATE STRATEGY | 20 |
| ☐ CHARG_TEND | CALCULATE CHARGES AND START AUTOMATIC TENDERING | UNFIX_TORC | UNFIX TORS FOR CREATE STRATEGY | 5 |
| ☐ CHARG_TEND | CALCULATE CHARGES AND START AUTOMATIC TENDERING | CALC_CHARG | CALCULATE CHARGES | 10 |
| ☐ CHARG_TEND | CALCULATE CHARGES AND START AUTOMATIC TENDERING | STARTATEND | START AUTOMATIC TENDERING | 20 |
| ☐ CHARG_TEND | CALCULATE CHARGES AND START AUTOMATIC TENDERING | REFIX_TORC | REVIX TORS FOR CHANGE STRATEGY | 30 |

806   804   802

800

ENTRY 15 OF 223

↑≡POSITION...

*FIG. 8*

BUSINESS PROCESS DEFINITION AND CONTROL SERVICE

TECHNICAL FIELD

This document generally relates to computer software. More specifically, this document relates to a definition and control service for business processes.

BACKGROUND

Business processes defined by business process models in modern enterprise resource planning (ERP) systems typically specify a number of process steps. Many business processes have evolved from single-enterprise business processes into inter-connected and networked business processes involving numerous, geographically-distributed business entities.

Business process management suites (BPMS) may be employed to pursue a model-driven approach to automating and monitoring business processes. A graphical process model that results from some process analysis or re-engineering phase may be enacted (e.g., deployed to a production system where it automates and enforces the corresponding process) with short turnaround times, saving on development cost for custom business applications. As a result, BPMS are often used in addition to provide custom functionality layered on top of "core" business applications (e.g., standard procedures that are implemented by an ERP suite).

BRIEF DESCRIPTION OF DRAWINGS

The present disclosure is illustrated by way of example and not limitation in the figures of the accompanying drawings, in which like references indicate similar elements.

FIG. 3 is a diagram illustrating process controller definition and setup, in accordance with an example embodiment.

FIG. 5 is a diagram illustrating process controller methods being assigned multiple times, in accordance with an example embodiment.

FIG. 6 is a flow diagram illustrating a method, in accordance with an example embodiment.

FIG. 7 is a screen capture illustrating an example of such a mapping, in accordance with an example embodiment.

FIG. 8 is a screen capture illustrating a plurality of strategies, in accordance with an example embodiment.

DETAILED DESCRIPTION

Figure 1:
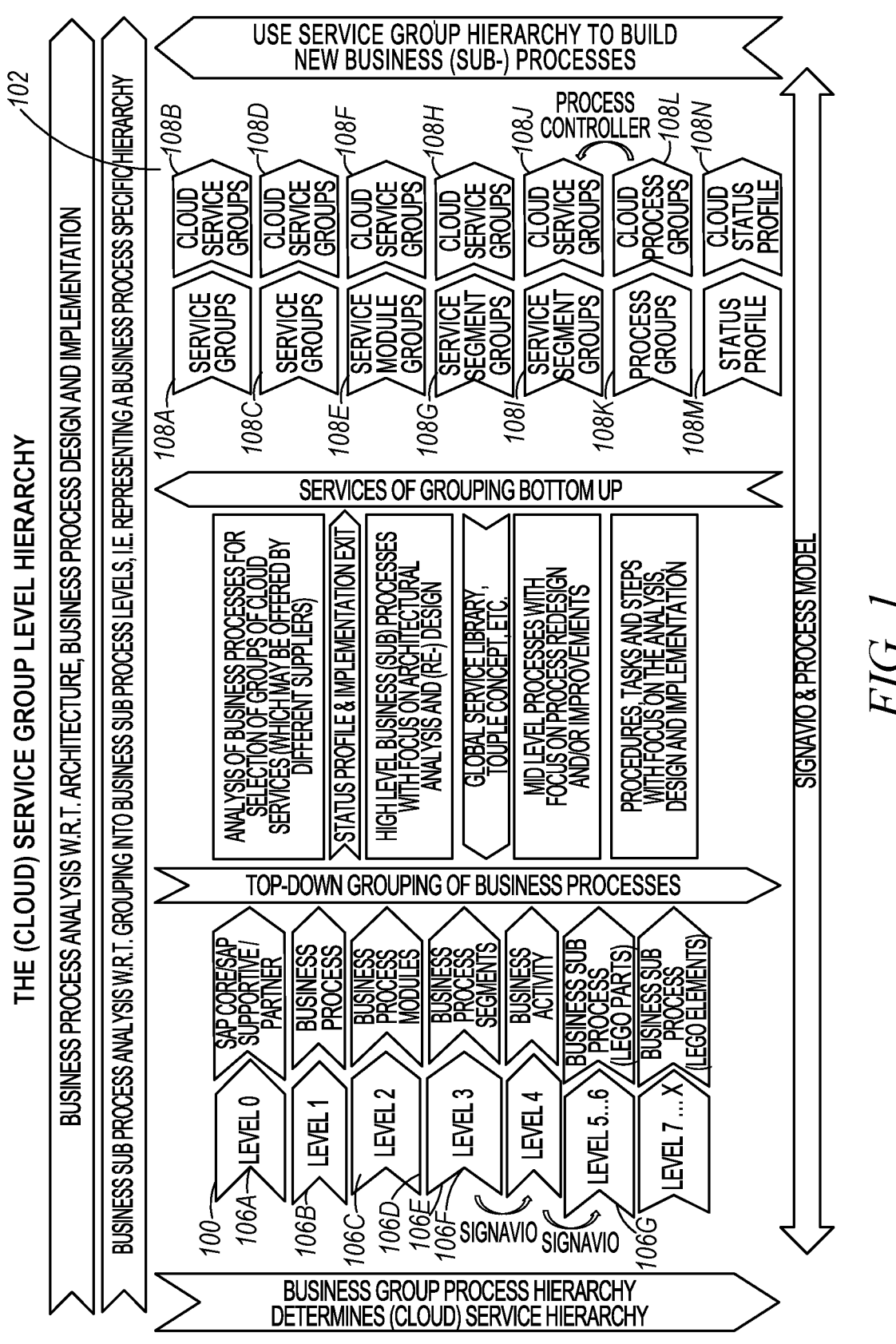
FIG. 1 is a diagram illustrating a business process hierarchy and a service group level, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Complex computer programs are nowadays typically developed using model-driven engineering. That is, instead of directly writing the software code, graphical models are created, from which the actual code may then be automatically or semi-automatically generated. Model-driven engineering is not only used for the development of software, but is also applied for the development and manufacturing of complex technical products, such as automobiles or other machinery. Further, not only products but also processes can be defined using models, and software applications can be used which then control the proper execution of the process steps in accordance with the model. This applies to the development, design, and execution of processes such as the sequence of steps to be executed on an assembly belt or even a business process that defines a certain sequence of tasks to be executed by software components and/or personnel to accomplish an overall complex task.

Generally, a graphical model comprises objects and relations therebetween in accordance with a predefined format and for a given purpose. A given object may occur in different models, e.g., an object representing a certain software component may occur both in a structural diagram (to define its interfaces to other components) and in a flow chart (to define its interaction with other components). Accordingly, a model may be generally understood as a particular "view" on an underlying object net.

With the increasing complexity of such models, it is desired to execute queries on the modelled object net in order to analyze the modelled subject matter. For example, one might ask "which other components must have finished their processing in order for my component to function properly?". Such a query involves relationships between multiple objects, which might be scattered across various different models. Objects in a software process description may be involved systems, master data and their usage in a specific process step, transactional data which are derived from the mater data used in a process step, and all this together can be described in a business (sub) process configuration definition. The definition will be used for the grouping of the services accordingly. More importantly, relationships between multiple objects might not be modelled explicitly, but oftentimes can only be implicitly derived from the various models. Moreover, complex subject matter is typically modelled using a variety of different modelling languages, so that a given object might be represented completely differently in different models. This is described in the configuration definition. Common attributes will be used for later grouping of services or hierarchies. For these reasons, querying a complex object net is a very difficult and complex task.

In the prior art, a number of approaches have been proposed to query graphical models. In the field of business process modelling, various Business Process Management (BPM) products are known which allow the modelling of business processes and which control their execution. Examples of such BPM solutions are Signavio, BOC Group Adonis, Mega, and Casewise. To analyze such business models, conventional BPM products typically provide scripting languages or SQL (Structured Query Language) interfaces for formulating queries.

A technical issue encountered with such BPM products, however, is that users are unable to control business processes that are defined over multiple different applications and/or systems. It is, for example, not possible with prior art BPM processes to, in a cloud environment, define the cloud service system setup using one application or system and then have a separate cloud service take control of all the business processes that have been defined. It is also, for example, not possible with prior art BPM processes to, in the cloud environment, have an initial business process defined and created in a system setup, or even define an allowed delta process to track sequential steps on different levels of a business process with hierarchical dependencies spanning different systems.

In an example embodiment, a new methodology for describing business processes and permissible process variants is introduced. Additionally, an allowed system status and involved master data objects with read and change authorization can be defined for process step. If a user wants to run the defined process in a BPM product such as Signavio, the system connection may be made with a central solution manager system so it is possible to run predefined processes. Thus, as soon as a process step shall be executed, the central cloud service running in the central solution manager system can access all interfaced systems in a network and in those select and read the involved object and, based on the status of allowed actions to be executed, the process pointer can be read from the object from the source system. The process pointer keeps track of a business process from the solution manager system as the track and trace system (central cloud system) in the business process systems and the execution of the business process therein. The execution system, which may be a completely different system than the system that defined the business process, can then execute the process step, and the process pointer will store the data in involved systems and set a new status.

The result is that a user is able to set up and control business processes in a straightforward manner, as well as defining allowed process variants and defined returns.

The new methodology allows for a traditional hierarchical business process to be defined in a manner that is deeper (e.g., goes down more levels) than was possible before, such that the definition of a business process will include not just the process, process modules, process segments, and business activity, but will also include business sub processes and individual elements of those subprocesses. This additional information in the definition of a business process then allows for a bottom up grouping of services based on compatible business subprocesses. In that manner, a user of a system is then able to be presented with a selection of services compatible with a particular business activity of the business process the user is trying to define, despite the fact that those services may have been defined by a completely separate system. For example, a system where automotive manufacturing processes are defined can utilize a business subprocess defined by a completely unrelated system where natural gas distribution processes are defined, without the user of the automotive manufacturing process system having any domain knowledge about natural gas distribution.

FIG. 1 is a diagram illustrating a business process hierarchy 100 and a service group hierarchy 102 in accordance with an example embodiment, in accordance with an example embodiment. The business process hierarchy 100 includes multiple sets of levels 106A-106G. A first level 106A involves a core business or business partner. A second level 106B involves one or more business processes for the core business or business partner. A third level 106C involves one or more business process modules for the business processes. A fourth level 106D involves one or more business process segments of the business process modules. A fifth level 106E involves one or more business activities of the business process segments. Prior art BPM products allow users to define down to the fourth level 106D, although theoretically they can be used to define down to the fifth level 106E, but not beyond that.

In accordance with an example embodiment, an architecture and methodology is provided that allows users to define down to a sixth level 106F or even a seventh level 106G. The sixth level 106F, which may actually comprise one or more levels on its own, may involve business sub processes of the business activities, and specifically interchangeable parts of such business sub processes. The seventh level 106G, which may also comprise one or more levels on its own, may also involve business sub processes of the business activities, but specifically interchangeable elements of such business sub processes.

Creation of the sixth level 106F involves mid-level processes with focus on process redesign and/or improvements. Creation of the seventh level 106G involves procedures, tasks, and steps with the focus on analysis, design, and implementation.

Once the business sub processes, and the constituent interchangeable parts and elements, have been defined, a service group hierarchy 102 is used to build new business sub-processes using interchangeable parts, to create groupings of services.

Here, the service group hierarchy 102 includes cloud service and (non-cloud) service groups at each level. For example, a first level includes a status profile 108A and a cloud status profile 108B. A second level includes process groups 108C and cloud process groups 108D. A process controller, which will be described in more detail below, then helps form a third level, which includes service activity groups 108E and cloud service activity groups 108F.

A fourth level includes service segment groups 108G and cloud service segment groups 108H. A fifth level includes service module groups 108I and cloud service module groups 108J. A sixth level includes service groups 108K and cloud service groups 108L. A seventh level includes service cores/partners 108M and cloud service core/partners 108N.

Figure 2:
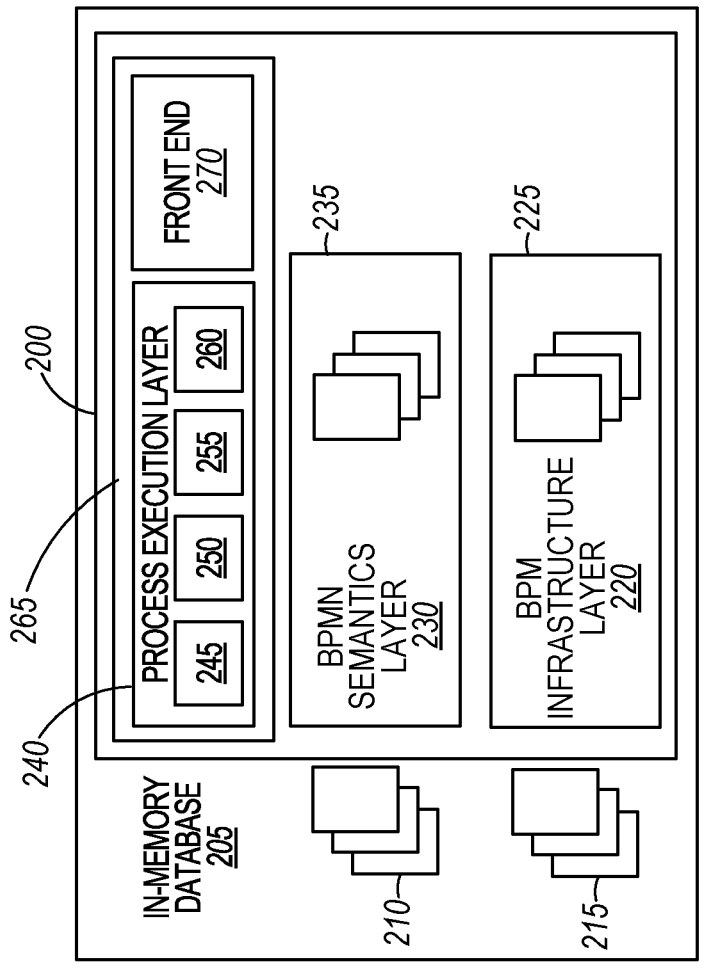
FIG. 2 illustrates an example architecture of a BPMS runtime layered on an in-memory database, in accordance with an example embodiment

FIG. 2 illustrates an example architecture of a BPMS runtime 200 layered on an in-memory database 205, in accordance with an example embodiment. In some embodiments, the illustrated architecture may be implemented in a distributed computing system.

The illustrated BPMS runtime 200, in some embodiments, maps process models and core runtime components to database views and stored procedures coded in, for example, SQLScript, or other script programming language. The illustrated BPMS runtime 200 includes a BPM Infrastructure Layer 220, a BPMS Semantics Layer 230, and a Process Execution Layer 240. In the illustrated embodiment, the BPMS runtime 200 also includes a compiler 265. In alternative embodiments, however, the compiler 265 may be a separate component apart from the BPMS 200.

The illustrated BPM Infrastructure Layer 220, at a high level, provides for fundamental BPM data structures (e.g., processes, tokens, and events). For example, generic process management features (e.g., for process monitoring and administration, etc.) and (partially) repository capabilities (e.g., for process lifecycle and versioning, etc.) may be based on the BPM Infrastructure Layer 220. Such features may (in addition to external user interfaces) require additional data structures and/or procedures that are logically part of the BPM Infrastructure Layer 220.

The illustrated BPMN Semantics Layer 230, at a high level, provides for a large set of reusable procedures (e.g., SQLScript procedures) that generically execute BPMN arti-facts (e.g., activities, gateways, events, etc.). Procedures in this layer may be parameterized to assume a concrete desired semantics for a specific process model. For instance, a parallel split gateway procedure can be parameterized with the process and token identifiers triggering that gateway, the number of outbound branches, and the token "positions" for these branches in order to create exactly as many tokens (parallel threads of control) starting processing concrete control flow "branches" as required for the specific Parallel Split gateway in some process model.

The illustrated Process Execution Layer 240, at a high level, provides a process-specific view definition (named "Queue") which at any point in time may list ready-to-execute process steps with their specific parameters, and a procedure (e.g., a SQLScript procedure) acting as process scheduler, which may fetch process steps from that "Queue" view definition and trigger corresponding parameterized procedures from the BPMN semantics layer 230. In some embodiments, each process model is compiled into those two artifacts such that there may be multiple Process Execu-tion Layers 240, one for each "deployed" process model.

The compiler 265 includes a front end 270 and a back end (not pictured). At a high level, the compiler 265 may transform a process model (e.g., given in BPMN 2.0 exchange format) into the artifacts of the Process Execution Layer 240 (i.e., the process-specific "Queue" view definition and the "Scheduler" procedure). In some embodiments, the front end 270 may, for example, parse the process model (e.g., the BPMN 2.0 file, a BPL file, or some other process modeling standard) into a directed graph of typed nodes (representing process steps) and edges (representing control flow connectors), which jointly act as the process's inter-mediate representation within the compiler 265. The front end 270 may further assign unique token positions to all graph edges (control flow connectors).

In some embodiments, the back end may, for example, traverse the graph and let each process step therein generate, for example, SQL and SQLScript fragments representing the process step's queue sub-query and (if present) custom procedures. Further, the back end may then assemble these code fragments into the queue definition, the scheduler, the process Application Program Interface (API), and custom procedures, which are emitted into an output file (described more fully below).

The illustrated in-memory database 205, in some embodi-ments, may include volatile electronic memory (e.g., ran-dom access memory (RAM)) that stores one or more data-base tables 210 and one or more data cubes 215, as well as other business data (e.g., business objects and otherwise). For example, the data cube 215 may be OLAP (online analytical processing) cubes that consist of data structures that allow for columnar data storage rather than, e.g., row data storage; different types of indices compared to rela-tional databases; and in-memory technology as compared to data stored in relational databases. The data cube 215 may also allow manipulation and/or analysis of the data stored in the cube from multiple perspectives, e.g., by dimensions, measures, and/or elements of the cube 205. A cube dimen-sion defines a category of data stored in the cube, for example, a time duration of certain business data, a product or service, business user roles, and a variety of other categories. In other words, a cube dimension may be one way to slice business data stored in the cube according to some business logic (e.g., logic within and/or associated with the contextual workspace modules). In some instances, the data cube 215 may have three dimensions, but any number of dimensions may be designed into the cube 205 (e.g., a hypercube).

A cube measure may be a fact, such as a numeric fact, that is categorized into one or more dimensions. Measures may include, for example, specific product sales data according to a set period of time. Measures may also include, for example, manufacturing efficiency data for a particular organizational unit of a business enterprise. In short, mea-sures may include any appropriate business data that may be manipulated according to business logic to assist or support the business enterprise.

One or more functions may be performed on a data cube 215. For instance, the data cube 215 may be pivoted, in various ways. Each pivot provides the business user with a distinct view of particular business data stored in the cube 205. For instance, in one view, a business user may be presented with sales data of a specific data within a particu-lar geographic region across a particular time period with a particular focus on the sales vs. geography relationship. In another view, the same data (e.g., the same measures and elements) may be presented with a different focus, e.g., the sales vs. time period relationship. In some aspects, pivoting a data cube 215 in real-time may allow the business user to more efficiently analyze the business data.

Turning to the BPM Infrastructure Layer 220, one or more data structures 225 are stored in this layer. Such data structures 225 may include, for example, processes, tokens, events, and otherwise. Entities of the BPM Infrastructure Layer 220 may be stored in a schema "BPM." For example, representations of the processes may be centered around process instances and tokens therein, which become records in a PROCESSES and TOKENS table, respectively. Process instances may denote the existence and lifetime of a single instantiation of some process model. Process instances may carry some metadata attributes, such as, for example, a SUSPENDED flag, denoting whether or not the process can currently make and progress. Process instances may also be nested, forming hierarchies of parent processes and sub processes, represented by a PARENT_ID foreign key attri-bute, identifying one process instance's parent process and another PARENT_TOKEN_ID foreign key attribute that identifies the parent process's token, which has triggered the sub-process activity launching the particular (sub-) process instance. The sub-process instance may, in some embodi-ments, be used to correctly resume an (invoking) parent process when the (invoked) sub-process is complete.

Tokens, in turn, may represent a thread of control within a process instance (e.g., markers walking through the cor-responding process model). Whatever process step a token currently "points to" may, in some instances, be the next step to be executed. Multiple tokens within one process instance may denote multiple concurrent threads making simultane-ous (e.g., substantially or otherwise) progress in that process instance.

The BPM Infrastructure Layer 220 may also provide for support functionality to facilitate correctly prioritized de-queuing of ready-to-execute process steps from the view in the Process Execution Layer 240. Turning to the BPMN Semantics Layer 230, as illustrated, this layer includes procedures 235 (e.g., SQLScript procedures) for BPMN artifacts such as various types of events, activities, and gateways. The illustrated BPMN Semantics Layer 230 may define the procedures that correspond to the baseline control flow artifacts, for example: start and end events (instance lifecycle), various types of gateways (e.g., conditionals, concurrency, synchronization), basic activities (e.g., updating business objects (and other business data) stored in the database), and sub-process invocation and completion (e.g., process aggregation and structuring). The procedures 235 described below may capture the "action" part of various BPMN artifacts (i.e., what is done when that artifact gets executed). Such procedures 235 (e.g., SQLScript procedures) may be called in the course of process execution as done as part of the Process Execution Layer 240. In other words, those procedures 235 make certain implicit contextual assumptions in the particular situation which they are being called.

The Process Execution Layer 240 represents a specific process model, e.g., each process model yields its own Process Execution Layer 240. Specifically, the compiler 265 may bridge the gap between the process modeling language (e.g., BPMN 2.0) and its executable representation atop the in-memory database 205 (e.g., SQL and SQLScript).

In the illustrated embodiment, the Process Execution Layer 240 includes four parts. First, a queue view definition 245 accommodates the contextual conditions for each process step to be triggered. As such, it may take the state of the control flow (e.g., token positions, process suspension, etc.) into account. The queue view definition 245 may further evaluate branch conditions and prepare, for example, SQLScript arguments for calling the procedures of the BPMN Semantics Layer 230 with the custom contextual arguments.

Second, a scheduler 250 (e.g., Scheduler SQLScript procedure) polls the queue view definition 245 for ready-to-be-executed procedures, such as SQLScript procedures. This includes fetching and parsing the corresponding parameters, and ultimately executing the SQLScript procedure.

Third and optionally, custom procedures (e.g., SQLScript) and other database entities (such as tables, views, etc.) 255, which extend the standard library functionality from the BPMN Semantics Layer 230, may be included in the Process Execution Layer 240.

Fourth, a process API 260, made up from a number of procedures (e.g., SQLScript) that perform basic interactions with processes, is included in the illustrated embodiment. Such interactions may include, for example, to launch a new instance, monitor processes, abort processes, and so forth.

In some example embodiments, the BPMS runtime 200 layered on the in-memory database 205 may follow a rule-driven approach in which each process step is guarded by a rule specifying its contextual conditions. Such conditions may define when some process step is ready to be executed. It may refer to the state of the process (in particular the position of its tokens) and also incorporate other predicates (like routing conditions for decision gateways). Further, the conditions also need to calculate the parameters that are fed into some procedures. For instance, many procedures may require the token identity (i.e., the primary key of a record in the TOKENS table) and the position to which the token shall be set when completing the process step to be passed in. As the number and type of parameters varies for different process steps, the view condition merely assembles a Uniform Resource Locator (URL)-encoded string which is later parsed by the scheduler 250 (e.g., calling the DECODE_PARAMETERS procedure from the BPM Infrastructure layer) and passed into the procedures 235 (as the parameters argument).

At any point in time, there may be multiple running process instances (that correspond to one and the same Process Execution Layer 240) where each process instance may further make progress with multiple tokens such that a number of process steps may be "ready" for execution. For example, the individual rules (representing the contextual assumptions of the process steps) may be assembled into a single queue view definition 245 (e.g., named QUEUE). That view can be queried for ready-to-run process steps, represented by a tuple that (among other data) refers to the affected process instance, a logical name of the artifact, and custom (e.g., string-encoded) arguments to a procedure 235 (e.g., SQLScript) that performs the corresponding business logics.

The process scheduler 250, in some embodiments, may be another procedure (e.g., SQLScript) that regularly queries the queue view definition 245 and executes the procedure 235 of the top-most query result.

The Process API 260 includes various procedures (e.g., SQLScript) to interact with a process instance (or multiple instances) and to monitor the course of process execution.

The methodology described earlier creates arbitrary processes from existing functions, sub-processes, and so forth. Specifically, a business process is described with a set of sub-business possesses that are possible to be classified. A BPM is used to model suitable sub-business process levels. The sub-business processes are then classified according to a library set of characters used in the cloud service library. Suitable cloud services are then obtained from the cloud service library and the sub-processes are described by the sequence of cloud services. The BPM is then used to create a hierarchical business process with both horizontal and vertical sub-process dependencies and/or relationships. The hierarchical service groups and group elements are then extracted and status profiles controlling the automated execution of cloud services are created, respecting the hierarchical dependencies.

A process controller 270 is provided to tie together vertical and horizontal processing. FIG. 3 is a diagram illustrating process controller definition and setup, in accordance with an example embodiment. There are seven steps that are performed using the process controller. These include define service 300, define strategy 302, define methods 304, assign methods to a strategy 306, define parameters 308, assign parameters to a method 310, and assign method parameters to a strategy 312.

After defining services, a list of process controller services 314 may appear. Likewise, after defining strategies, a list of process controller strategies 316 may appear.

Figure 4:
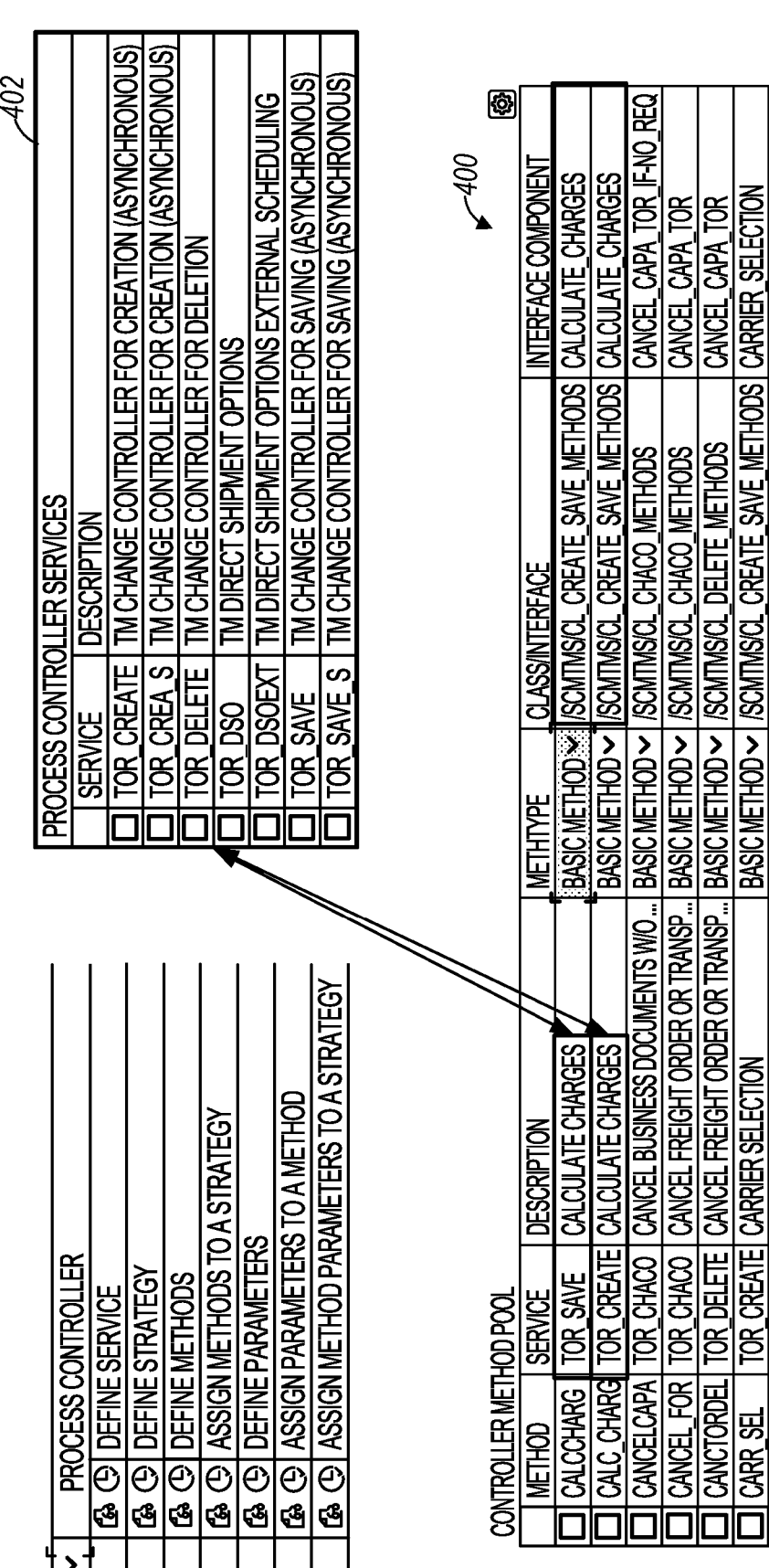
FIG. 4 is a diagram illustrating how a bridge is formed, in accordance with an example embodiment.

The process controller 270 also acts as a bridge between business process definitions and development requirements. FIG. 4 is a diagram illustrating how this bridge is formed, in accordance with an example embodiment. Specifically, controller methods in a controller method pool 400 may be linked, using the process controller 270, to one or more process controller services 402.

A process controller method assignment is developed a single time, but then can be assigned multiple times. FIG. 5 is a diagram illustrating process controller methods being assigned multiple times, in accordance with an example embodiment. Here, for example, a calculate charges after each save strategy 500 can be assigned to multiple process controller methods 502, 504. While not pictured, these multiple process controller method 502, 504 can actually be on multiple different ERP systems.

A service group includes individual process steps of a strategy that can be executed at arbitrary locations. Service groups contain variants of a business process step. While a strategy is a business process, the service groups are the elements out of which concrete process steps are chosen. As soon as the execution of a process controller method is restricted to a single location, it is more appropriate to discuss it as a business service provided at that location. Hence, a business service is a functionality that is offered at a particular location, and the specific process controller methods assigned to the location are the potential members for the service groups.

As such, a business process variation (or "variant") can now replace the original business process. If a variant is not assigned to a concrete location, then it is considered to be a "global" business process variant, while if it is assigned to a concrete location, it represents a "local" business process.

The above methodology comprises two parts. The first is the top-down grouping of business processes. The second is bottom-up grouping of services. FIG. 6 is a flow diagram illustrating a method 600, in accordance with an example embodiment. At operation 602, a first business process model is obtained. A business process is a set of activities that have to be performed to complete an end-to-end business scenario. A business process model is a software model that executes a business process, representing the steps of the business process as nodes in a graph, some of which can be executed by a computer processor. For example, a Recruit-to-Retire business process lists all activities that need to be performed from when an employee is recruited to the time they retire. Other example business processes include Source-to-Pay and Lead-to-Cash. At operation 604, the business sub-processes of the first business process model and the sequence in which they are performed are identified. At operation 606, for each of one or more of the business sub-processes, a business document that is used by the corresponding business sub-process is identified. A business document is an object with an industry-specific name, purpose, or usage. This may include, for example, active and/or passive resources, such as a forwarding order or freight order.

At operation 608, for each of the one or more of the business sub-processes, any business sub-processes that can be restricted to a particular software component are mapped to that software component as a process controller service. Examples of software components in a general cloud-based system include a mobile infrastructure component, a business warehouse component, an application server, and a knowledge management component. These components may, however, be system specific. Examples of software components in a transportation management system may include forwarding order management, freight order management, planning, settlement, and integration.

At operation 610, one or more business functions in each of the one or more business sub-processes are identified. At operation 612, for each of the one or more business functions, any business function that can be restricted to a particular business document can be mapped to that particular business document as a process controller method. In an example embodiment, these business functions are essentially subsets of higher-level steps of the business process, resulting in a hierarchical organization.

At operation 614, each of the one or more process controller methods is mapped to a development object class and a corresponding interface component within the development object class. The interface component is essentially a software procedure within the class that needs to be executed when the mapped process controller method is executed. FIG. 7 is a screen capture illustrating an example of such a mapping, in accordance with an example embodiment. Here, a controller method pool 700 includes a "cancel for" process controller method 702, which has been mapped to the "CANCEL_CAPA_TOR" interface component 704 within the "/SCMTMS/CL_CHACO_METHODS" class 706. The interface component is a code snippet that is executed when the corresponding process controller method is executed. This allows the hierarchical framework to bridge between the business side and the code-level development side and allows an executing system to load the correct code, even when that code was developed for a different system entirely.

In an example embodiment, the development object class is an Advanced Business Application Programming (ABAP) or other object oriented development object.

Referring back to FIG. 6, at operation 616, one or more process controller strategy is created. A strategy is an ordered list of process controller methods. Essentially, the process controller methods within a single strategy reflect the functions available to a business document associated with the strategy. Thus, referring back to FIG. 5, the process control methods UNFIX TORS 502 and REFIX TORS 504 are assigned to the strategy CALC_CHARGE 500, which is associated with the business document freight order" (not pictured).

Another aspect of a strategy is the modeling of a concrete functionality that is offered and assigned to a business document.

FIG. 8 is a screen capture illustrating a plurality of strategies, in accordance with an example embodiment. Here, for example, it can be seen that three process controller methods: "Unfix TORs for Create Strategy" 802, "Carrier Selection" 804, and "Refix TORs for Create Strategy" 806, can all be assigned to the same strategy CARR_SEL" 800. The sequence numbers next to each of the process controller methods 802-806 indicate the ordering that the process controller methods 802-806 should be executed.

Referring back to FIG. 6, at operation 618, the process controller strategies, process controller methods, and process controller services are stored in a cloud service library.

At operation 620, the process controller strategies, process controller methods, and process controller services in the cloud service library are grouped based on common business documents. Thus, if there are three process controller services pertaining to a particular business document, then the three process controller services and their corresponding process controller strategies and process controller methods are grouped in a single service group.

It should be noted that this is only one grouping layer. Another may be the configuration setup for a business document in the process (e.g., a business document "customer order" can be a purchaser order in an ERP system or a forwarding order in a transportation management system).

At operation 622, a second business process model is obtained. This second business process may, in some example embodiments, be defined by a separate system than the system that defined the first business process. At operation 624, the business sub-processes of the second business process model and the sequence in which they are performed are identified. At operation 626. for each of one or more of the business sub-processes of the second business process model, a business document that is used by the corresponding business sub-process is identified.

At operation 628, for at least one of the business documents for the second business process, a corresponding service group in the cloud service library is identified. Then, at operation 630, one or more process controller methods in the corresponding service group are presented in a graphical user interface to a user as a permissible variant of the second business process.

In view of the disclosure above, various examples are set forth below. It should be noted that one or more features of an example, taken in isolation or combination, should be considered within the disclosure of this application.

Example 1. A system comprising:

at least one hardware processor; and a computer-readable medium storing instructions that, when executed by the at least one hardware processor, cause the at least one hardware processor to perform operations comprising:

obtaining a first process model;

for each of one or more of a plurality of sub-processes in the first process model, identifying one or more software objects used by a corresponding sub-process;

mapping any of the one or more sub-processes that can be restricted to a corresponding software component to the corresponding software component as a process controller service;

for each of the one or more sub-processes, identifying at least one function performed by the corresponding sub-process;

mapping any function that can be restricted to a corresponding software object to the corresponding software object as a process controller method;

mapping each of the process controller methods to a development class and corresponding interface component;

creating one or more process controller strategies as ordered lists of process controller methods;

storing the process controller services, process controller methods, and process controller strategies in a cloud service library;

grouping the process controller services, process controller methods, and process controller strategies in a cloud service library into service groups;

obtaining a second process model; and based on the service groups, presenting one or more process controller methods in a graphical user interface as permissible variants for the second process model.

Example 2. The system of Example 1, wherein the first process model is executed by a first system and the second process model is executed by a second system of a separate system type than the first system.

Example 3. The system of Examples 1 or 2, wherein the grouping organizes the service groups such that each service group corresponds to a different one of the one or more software objects.

Example 4. The system of Example 3, wherein the operations further comprise:

for each of one or more of a plurality of sub-processes in the second process model, identifying one or more software objects used by a corresponding sub-process of the second process model;

identifying a service group, corresponding to one of the one or more software objects used by a corresponding sub-process of the second process model, from the cloud service library; and wherein the presenting includes presenting one or more process controller methods in the identified service group.

Example 5. The system of any of Examples 1-4, wherein the operations are performed by a process management runtime.

Example 6. The system of Example 5, wherein the process management runtime operates in an in-memory database.

Example 7. The system of any of Examples 1-6, wherein the corresponding interface component is a code snippet contained in the development class, the code snippet being executed upon execution of the corresponding process controller method.

Example 8. A method comprising:

obtaining a first process model;

for each of one or more of a plurality of sub-processes in the first process model, identifying one or more software objects used by a corresponding sub-process;

mapping any of the one or more sub-processes that can be restricted to a corresponding software component to the corresponding software component as a process controller service;

for each of the one or more sub-processes, identifying at least one function performed by the corresponding sub-process;

mapping any function that can be restricted to a corresponding software object to the corresponding software object as a process controller method;

mapping each of the process controller methods to a development class and corresponding interface component;

creating one or more process controller strategies as ordered lists of process controller methods;

storing the process controller services, process controller methods, and process controller strategies in a cloud service library;

grouping the process controller services, process controller methods, and process controller strategies in a cloud service library into service groups;

obtaining a second process model; and based on the service groups, presenting one or more process controller methods in a graphical user interface as permissible variants for the second process model.

Example 9. The method of Example 8, wherein the first process model is executed by a first system and the second process model is executed by a second system of a separate system type than the first system.

Example 10. The method of Examples 8 or 9, wherein the grouping organizes the service groups such that each service group corresponds to a different one of the one or more software objects.

Example 11. The method of Example 10, further comprising:

for each of one or more of a plurality of sub-processes in the second process model, identifying one or more software objects used by a corresponding sub-process of the second process model;

identifying a service group, corresponding to one of the one or more software objects used by a corresponding sub-process of the second process model, from the cloud service library; and wherein the presenting includes presenting one or more process controller methods in the identified service group.

Example 12. The method of any of Examples 8-11, wherein the method is performed by a process management runtime.

Example 13. The method of Example 12, wherein the process management runtime operates in an in-memory database.

Example 14. The method of any of Examples 8-13, wherein the corresponding interface component is a code snippet contained in the development class, the code snippet being executed upon execution of the corresponding process controller method.

Example 15. A non-transitory machine-readable medium storing instructions which, when executed by one or more processors, cause the one or more processors to perform operations comprising:

obtaining a first process model;

for each of one or more of a plurality of sub-processes in the first process model, identifying one or more software objects used by a corresponding sub-process;

mapping any of the one or more sub-processes that can be restricted to a corresponding software component to the corresponding software component as a process controller service;

for each of the one or more sub-processes, identifying at least one function performed by the corresponding sub-process;

mapping any function that can be restricted to a corresponding software object to the corresponding software object as a process controller method;

mapping each of the process controller methods to a development class and corresponding interface component;

creating one or more process controller strategies as ordered lists of process controller methods;

storing the process controller services, process controller methods, and process controller strategies in a cloud service library;

grouping the process controller services, process controller methods, and process controller strategies in a cloud service library into service groups;

obtaining a second process model; and based on the service groups, presenting one or more process controller methods in a graphical user interface as permissible variants for the second process model.

Example 16. The non-transitory machine-readable medium storing instructions of Example 15, wherein the first process model is executed by a first system and the second process model is executed by a second system of a separate system type than the first system.

Example 17. The non-transitory machine-readable medium storing instructions of Examples 15-16, wherein the grouping organizes the service groups such that each service group corresponds to a different one of the one or more software objects.

Example 18. The non-transitory machine-readable medium storing instructions of Example 17, further comprising:

for each of one or more of a plurality of sub-processes in the second process model, identifying one or more software objects used by a corresponding sub-process of the second process model;

identifying a service group, corresponding to one of the one or more software objects used by a corresponding sub-process of the second process model, from the cloud service library; and wherein the presenting includes presenting one or more process controller methods in the identified service group.

Example 19. The non-transitory machine-readable medium storing instructions of any of Examples 15-18, wherein the method is performed by a process management runtime.

Example 20. The non-transitory machine-readable medium storing instructions of Example 19, wherein the process management runtime operates in an in-memory database.

Figure 9:
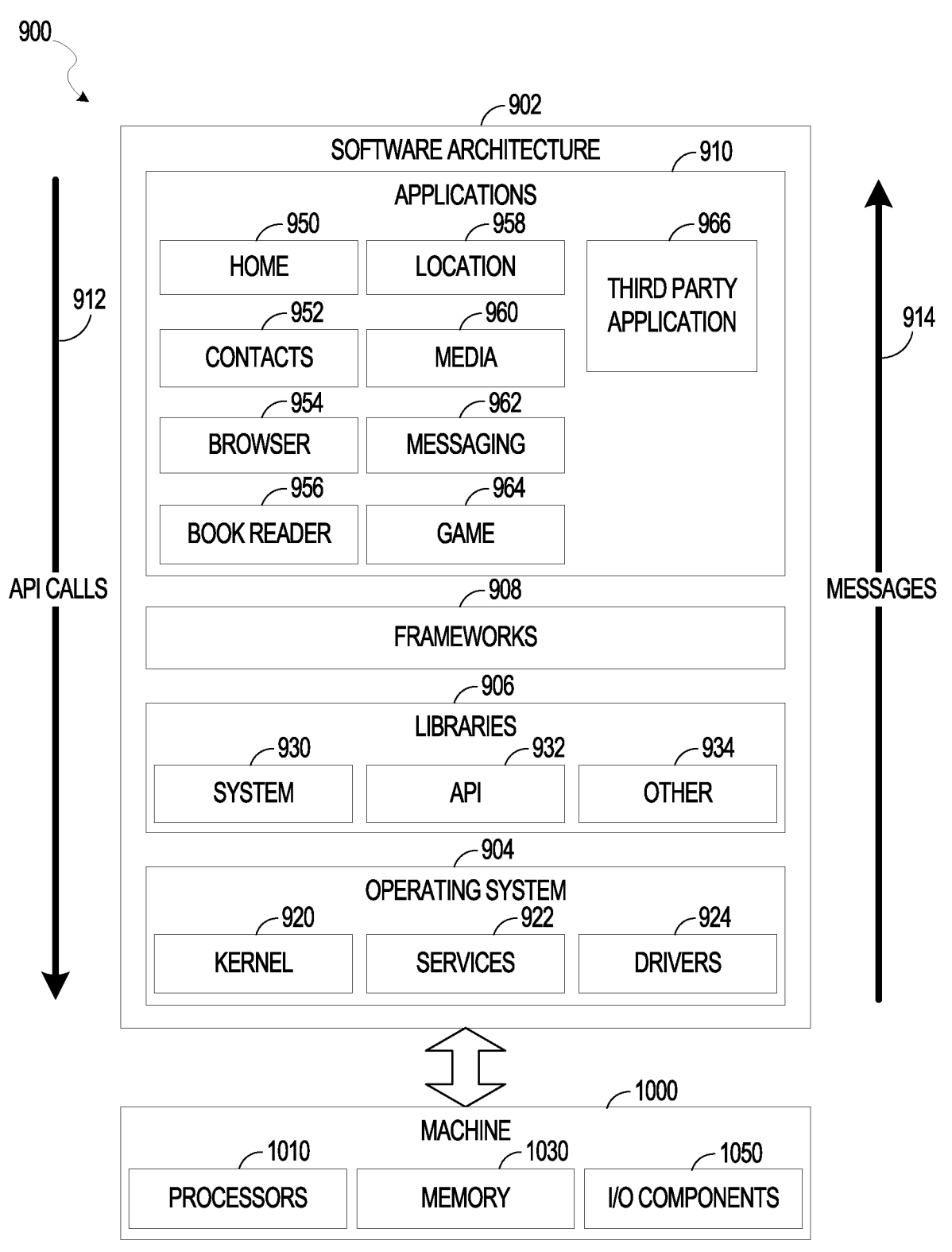
FIG. 9 is a block diagram illustrating an architecture of software, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
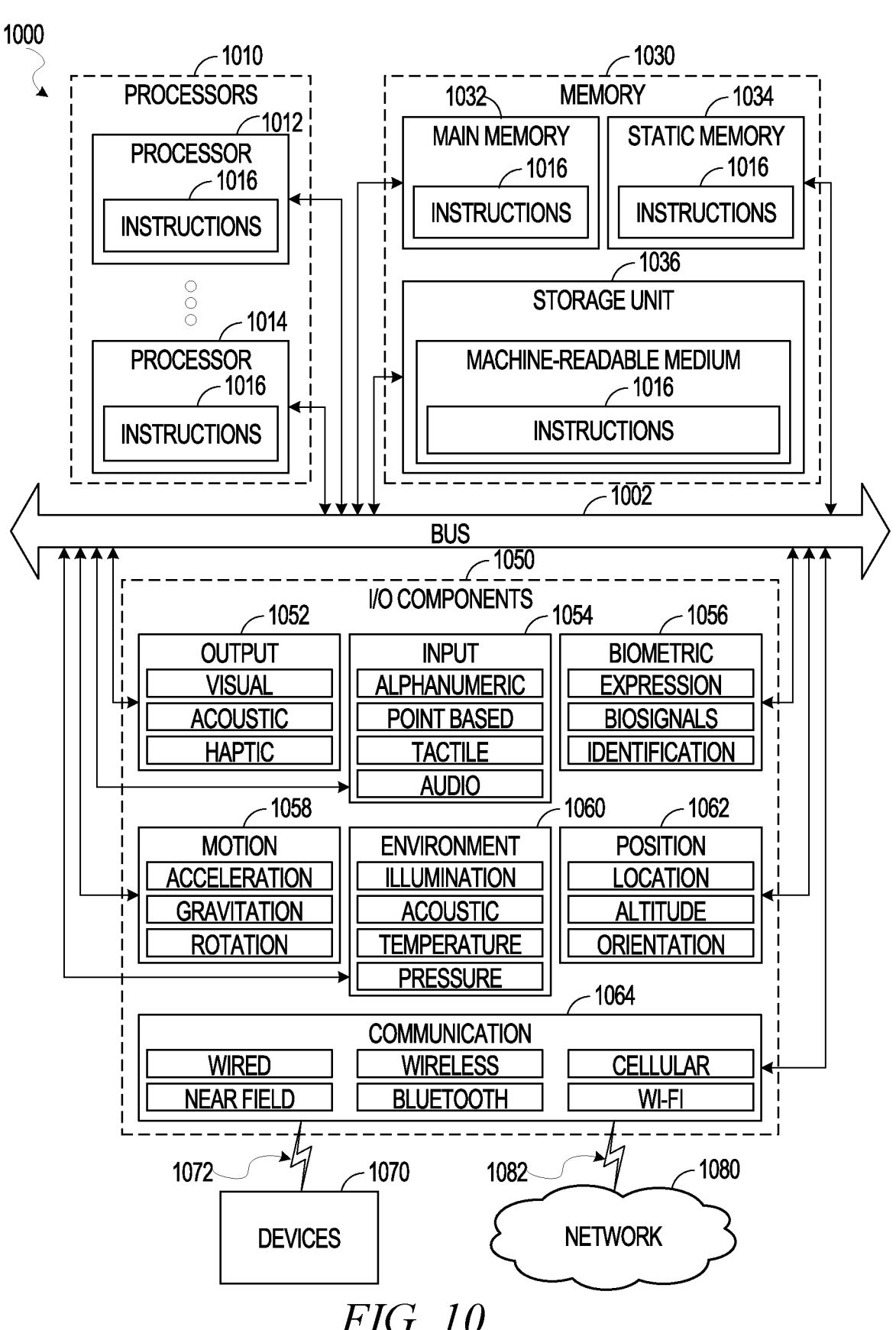
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the methods of FIG. 4. Additionally, or alternatively, the instructions 1016 may implement FIGS. 1-4 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
at least one hardware processor; and
a computer-readable medium storing instructions that, when executed by the at least one hardware processor, cause the system to perform operations comprising:
obtaining a first process model, the first process model describing objects and process steps occurring among the objects;
for each of one or more of a plurality of sub-processes in the first process model, identifying one or more software objects used by a corresponding sub-process;
mapping any of the one or more sub-processes that is restricted to a corresponding software component to the corresponding software component as a process controller service, wherein the corresponding software component is a logical unit of executable computer code;
for each of the one or more sub-processes, identifying at least one function performed by the corresponding sub-process;
mapping any function that is restricted to a corresponding software object to the corresponding software object as a process controller method;
mapping each of the process controller methods to a development class and corresponding interface component;
creating one or more process controller strategies as ordered lists of process controller methods;
storing the process controller services, process controller methods, and process controller strategies in a cloud service library;
grouping the process controller services, process controller methods, and process controller strategies in a cloud service library into service groups;
obtaining a second process model, the second process model describing objects and process steps occurring among the objects; and
based on the service groups, presenting one or more process controller methods in a graphical user interface as permissible variants for the second process model.

2. The system of claim 1, wherein the first process model is executed by a first system and the second process model is executed by a second system of a separate system type than the first system.

3. The system of claim 1, wherein the grouping organizes the service groups such that each service group corresponds to a different one of the one or more software objects.

4. The system of claim 3, wherein the operations further comprise:
for each of one or more of a plurality of sub-processes in the second process model, identifying one or more software objects used by a corresponding sub-process of the second process model;
identifying a service group, corresponding to one of the one or more software objects used by a corresponding sub-process of the second process model, from the cloud service library; and
wherein the presenting includes presenting one or more process controller methods in the identified service group.

5. The system of claim 1, wherein the operations are performed by a process management runtime.

6. The system of claim 5, wherein the process management runtime operates in an in-memory database.

7. The system of claim 1, wherein the corresponding interface component is a code snippet contained in the development class, the code snippet being executed upon execution of the corresponding process controller method.

8. A method comprising:
obtaining a first process model, the first process model describing objects and process steps occurring among the objects;
for each of one or more of a plurality of sub-processes in the first process model, identifying one or more software objects used by a corresponding sub-process;
mapping any of the one or more sub-processes that is restricted to a corresponding software component to the corresponding software component as a process controller service, wherein the corresponding software component is a logical unit of executable computer code;
for each of the one or more sub-processes, identifying at least one function performed by the corresponding sub-process;
mapping any function that is restricted to a corresponding software object to the corresponding software object as a process controller method;
mapping each of the process controller methods to a development class and corresponding interface component;
creating one or more process controller strategies as ordered lists of process controller methods;
storing the process controller services, process controller methods, and process controller strategies in a cloud service library;
grouping the process controller services, process controller methods, and process controller strategies in a cloud service library into service groups;
obtaining a second process model, the second process model describing objects and process steps occurring among the objects; and
based on the service groups, presenting one or more process controller methods in a graphical user interface as permissible variants for the second process model.

9. The method of claim 8, wherein the first process model is executed by a first system and the second process model is executed by a second system of a separate system type than the first system.

10. The method of claim 8, wherein the grouping organizes the service groups such that each service group corresponds to a different one of the one or more software objects.

11. The method of claim 10, further comprising:

for each of one or more of a plurality of sub-processes in the second process model, identifying one or more software objects used by a corresponding sub-process of the second process model;

identifying a service group, corresponding to one of the one or more software objects used by a corresponding sub-process of the second process model, from the cloud service library; and wherein the presenting includes presenting one or more process controller methods in the identified service group.

12. The method of claim 8, wherein the method is performed by a process management runtime.

13. The method of claim 12, wherein the process management runtime operates in an in-memory database.

14. The method of claim 8, wherein the corresponding interface component is a code snippet contained in the development class, the code snippet being executed upon execution of the corresponding process controller method.

15. A non-transitory machine-readable medium storing instructions which, when executed by one or more processors, cause the one or more processors to perform operations comprising:

obtaining a first process model, the first process model describing objects and process steps occurring among the objects;

for each of one or more of a plurality of sub-processes in the first process model, identifying one or more software objects used by a corresponding sub-process;

mapping any of the one or more sub-processes that is restricted to a corresponding software component to the corresponding software component as a process controller service, wherein the corresponding software component is a logical unit of executable computer code;

for each of the one or more sub-processes, identifying at least one function performed by the corresponding sub-process;

mapping any function that is restricted to a corresponding software object to the corresponding software object as a process controller method;

mapping each of the process controller methods to a development class and corresponding interface component;

creating one or more process controller strategies as ordered lists of process controller methods;

storing the process controller services, process controller methods, and process controller strategies in a cloud service library;

grouping the process controller services, process controller methods, and process controller strategies in a cloud service library into service groups;

obtaining a second process model, the second process model describing objects and process steps occurring among the objects; and based on the service groups, presenting one or more process controller methods in a graphical user interface as permissible variants for the second process model.

16. The non-transitory machine-readable medium storing instructions of claim 15, wherein the first process model is executed by a first system and the second process model is executed by a second system of a separate system type than the first system.

17. The non-transitory machine-readable medium storing instructions of claim 15, wherein the grouping organizes the service groups such that each service group corresponds to a different one of the one or more software objects.

18. The non-transitory machine-readable medium storing instructions of claim 17, further comprising:

for each of one or more of a plurality of sub-processes in the second process model, identifying one or more software objects used by a corresponding sub-process of the second process model;

identifying a service group, corresponding to one of the one or more software objects used by a corresponding sub-process of the second process model, from the cloud service library; and wherein the presenting includes presenting one or more process controller methods in the identified service group.

19. The non-transitory machine-readable medium storing instructions of claim 15, wherein the method is performed by a process management runtime.

20. The non-transitory machine-readable medium storing instructions of claim 19, wherein the process management runtime operates in an in-memory database.

* * * * *